126. STOVES & FURNACES,
Water heaters, Kettle furnace,
348 Steam generators & cookers.
9,766 X
1 of 2
D. B. Barnum.
Agricultural Boiler.
Patented Jun. 25, 1836.
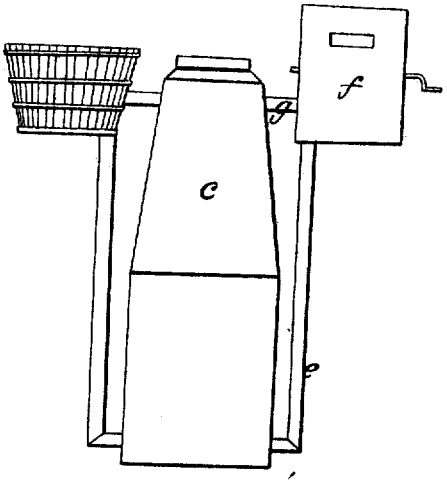
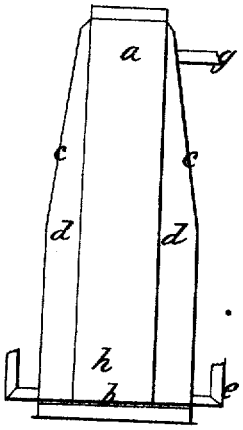

9,766 X
2 of 2
D. B. Barnum.
Agricultural Boiler.
No.
Patented Jun. 25, 1836.
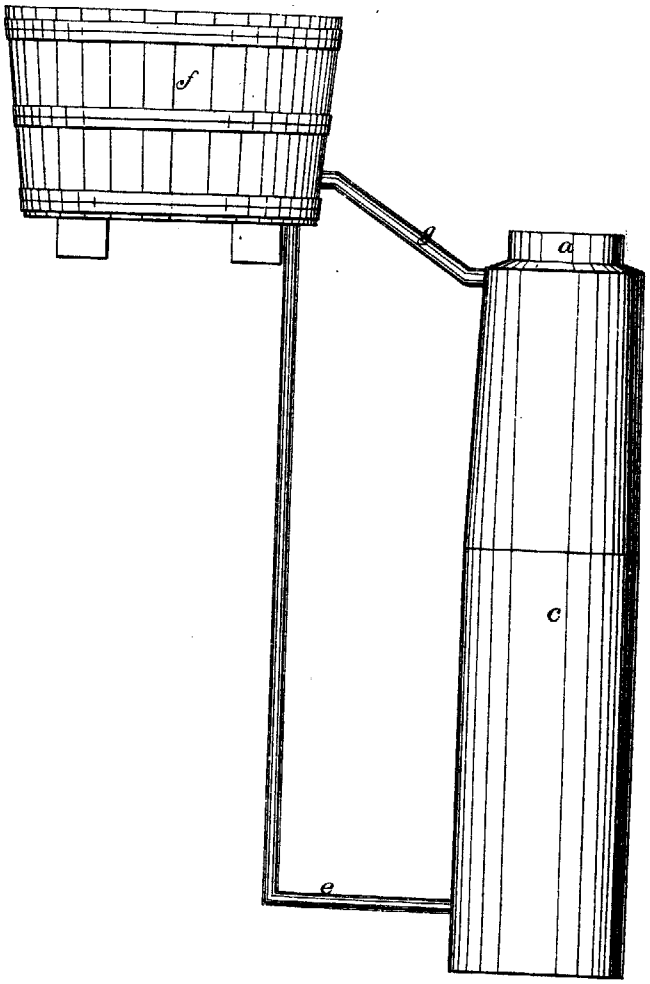
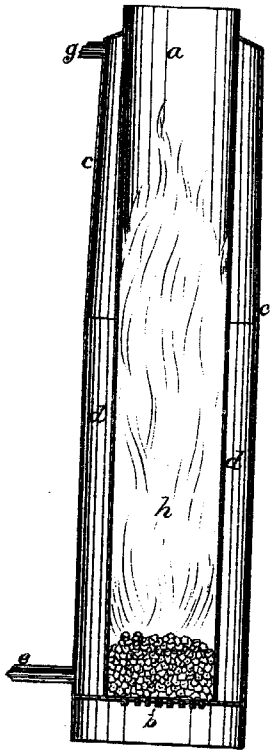

9766X

Dimon B. Barnum of New Fairfield, Connecticut

Letters Patent

The schedule referred to in these Letters Patent and making part of the same containing a description in the words of the said Dimon B. Barnum himself of his improvement in the apparatus for heating water for washing machines fulling machines hatters and clothiers use and for other purposes.

Be it known that I Dimon B. Barnum of New Fairfield in the county of Fairfield and State of Connecticut have invented a new and useful improvement in the apparatus for heating water for washing machines fulling machines hatters and clothiers use and for other purposes which is described as follows reference being had to the annexed drawings of the same making part of this specification.

The apparatus consists of a cylinder a open at the upper end and having a grate b at the lower end which cylinder is surrounded by another cylinder c united closely to the former so as to be water tight leaving a space d between the two to contain the water required to be heated which is introduced at the bottom by a pipe e leading from a vessel f placed above the cylinders into which vessel is inserted another pipe g leading from the upper end of the outer cylinder for admitting the heated water to circulate through this vessel (similar tubes and vessel may be placed on the other side of the cylinder for the same purpose) the fire is made in the fire chamber h within the inner cylinder the vessel from which the cold water is obtained and into which the hot water is returned and ci circulates may be used as a machine for washing cloth fulling cloth or for dyeing and clothing use or for other purposes

What I claim as my invention and which I desire to secure by letters patent consists in the before described apparatus for heating water for various purposes

Witnesses

Wm. P. Elliot

John Drummond

Lisson B. Barnum

Drawing

[432 v 21]

[illegible] Signed Dec. 2. 1849